(12) United States Patent
Dworatzek et al.

(10) Patent No.: US 6,918,939 B2
(45) Date of Patent: Jul. 19, 2005

(54) FILTER DEVICE

(75) Inventors: Klemens Dworatzek, Edingen (DE); Karlheinz Muenkel, Oberderdingen-Flehingen (DE); Marion Hartmann, Hockenheim (DE)

(73) Assignee: Mann & Hummel GmbH, Ludwigsburg (DE)

( * ) Notice: Subject to any disclaimer, the term of this patent is extended or adjusted under 35 U.S.C. 154(b) by 176 days.

(21) Appl. No.: 10/619,554

(22) Filed: Jul. 16, 2003

(65) Prior Publication Data

US 2004/0083692 A1 May 6, 2004

(30) Foreign Application Priority Data

Jul. 16, 2002 (DE) .......................................... 102 32 046

(51) Int. Cl.⁷ .............................................. B01D 35/30
(52) U.S. Cl. .................. 55/313; 55/385.3; 55/DIG. 28; 210/450
(58) Field of Search .......................... 55/310, 312, 313, 55/314, 385.3, DIG. 28; 210/450

(56) References Cited

U.S. PATENT DOCUMENTS

| 5,429,101 A | 7/1995 | Uebelhoer et al. |
|---|---|---|
| 5,450,835 A | 9/1995 | Wagner |
| 5,601,710 A * | 2/1997 | Yoon et al. .................. 210/232 |
| 6,723,149 B2 * | 4/2004 | Ernst et al. .................... 55/498 |

FOREIGN PATENT DOCUMENTS

DE          19647256 A1    5/1998
WO    WO 01/90540 A2    11/2001

OTHER PUBLICATIONS

Copy of German Search Report.

* cited by examiner

Primary Examiner—Robert A. Hopkins
(74) Attorney, Agent, or Firm—Crowell & Moring LLP

(57) ABSTRACT

A filter device having a filter element arranged in a filter housing that can be sealed by a housing lid with a sealing ring. The medium to be filtered is supplied to the filter element through an inlet opening in the filter housing. On the filtered side of the filter element, the filtered medium is discharged through an outlet opening in the filter housing. The housing lid is constructed in two parts and includes an inner lid and an outer lid. The inner lid can be inserted into a housing opening, with the sealing ring arranged between the inner lid and the wall of the housing opening. The outer lid covers the housing opening and is connected with the wall of the housing opening by a locking mechanism.

11 Claims, 4 Drawing Sheets

FILTER DEVICE

BACKGROUND OF THE INVENTION

The present invention relates to a filter device comprising a filter element arranged in a filter housing that can be sealed by a housing lid with a sealing ring, wherein a medium to be filtered is supplied to the filter element through an inlet opening in the filter housing, and filtered medium is discharged on the filtered side of the filter element through an outlet opening in the filter housing. The filter device of the present invention is particularly suitable for use as a crankcase ventilation filter.

Filter devices for crankcase ventilation, which are also referred to as oil separators, are used to filter and purify oil-containing air from the crankcase. The separated oil is returned to the oil circuit, and the cleaned air is normally introduced into the intake tract of the internal combustion engine. The filter device comprises a filter element in a filter housing, to which the oil-containing air is supplied through an inlet opening. The purified air is removed through an outlet opening in the filter housing. For safety reasons, a pressure relief valve is integrated into the housing lid. This pressure relief valve is under the pressure of the inlet side or the unfiltered side of the filter element, and when an overpressure limit is exceeded it moves to the open position to relieve the pressure in the filter housing.

Such filter devices are normally cylindrical in shape. The pressure relief valve is usually located in a housing lid that is placed on an axial end face of the filter housing. The pressure relief valve is fixed to the housing lid and is held in the closed position by a valve spring. As soon as the pressure in the filter housing exceeds a value that causes the pressure relief valve to open against the force of the valve spring, the oil-containing air flows through the valve out of the filter housing.

The housing lid is disposed on or in an axial housing opening on the end face of the filter housing and is sealed by a circumferential sealing ring located between the inside of the wall of the housing opening and the outside of the housing lid. The housing lid is normally screwed into the housing opening. For this purpose, a thread is provided between the wall of the housing opening and the housing lid.

When the housing lid has to be removed, e.g., for maintenance purposes, there is a risk that the rotational motion that is required to open the housing lid may damage the sealing ring. Especially if the sealing ring has remained installed for a prolonged period of time between the wall of the housing opening and the housing lid, it may be tightly stuck between the two components. As a result, a relative rotational motion between the filter housing and the housing lid can lead to strong forces acting on the sealing ring in circumferential direction, which can damage the sealing ring. The adhesion of the sealing ring also requires substantially more force to open the housing lid.

SUMMARY OF THE INVENTION

It is the object of the present invention to provide an improved filter device suitable for use as a crankcase ventilation filter.

Another object of the invention is to provide a filter device which has a simple design with a filter housing and a removable housing lid.

A further object of the invention is to provide a filter device with a filter housing having a closeable lid which reliably seals the housing interior in a pressure tight manner when closed.

It is also an object of the invention to provide a filter device having a housing with a lid having a sealing ring in which forces acting on the sealing ring when the housing lid is opened and closed are minimized.

These and other objects are achieved in accordance with the present invention by providing a filter device comprising a filter element arranged in a filter housing that can be sealed by a housing lid with a sealing ring, wherein a medium to be filtered is supplied to the filter element through an inlet opening in the filter housing, and filtered medium is discharged through an outlet opening in the filter housing on the filtered side of the filter element; the housing lid is divided into two parts and comprises an inner lid and an outer lid; the inner lid can be inserted into a housing opening with the sealing ring arranged between the inner lid and a wall of the housing opening, and the outer lid covers the housing opening and is secured to a wall of the housing opening by a locking mechanism.

Advantageous preferred features and embodiments are described in further detail hereinafter.

According to the invention, the housing cover is constructed in two parts and comprises an inner lid and an outer lid. This makes it possible to allocate different functions to the inner lid and the outer lid. The inner lid is sealed by the sealing ring in a pressure-tight manner relative to the wall of the housing opening. The outer lid assumes a closing and retaining function. For this purpose it is provided with a locking mechanism between the outer lid and the wall of the housing opening. Thus the inner lid has a sealing function, while the outer lid has a retaining function and transmits the forces in longitudinal direction.

To mount the housing lid, the inner lid including the sealing ring is first inserted into the housing opening, for which different motions with axial, rotational or axial/rotational components come into consideration. After the inner lid has been inserted, the outer lid can be mounted, and the locking mechanism, which serves to connect the outer lid to the wall of the housing opening so as to transmit axial forces, can be closed.

The closing motion of the outer lid, due to its separate configuration, can be distinct from the closing or insertion motion of the inner lid. For example, it is possible to use a rotational motion to close and open the outer lid, in which case the locking mechanism is configured as a locking thread, which is advantageously formed on the outside of the housing wall and on the inside of the outer lid.

The locking thread can have sections with different thread pitch. In particular, the section adjacent to the locked position can have a smaller pitch than the section of the locking thread through which the outer lid passes at the beginning of the mounting and closing motion. This configuration has the advantage that when the outer lid is closed, it has to travel a relatively large axial closing path because of the greater thread pitch, but as it gets closer to the closed position it travels through a smaller axial path because of the smaller thread pitch, which makes it easier to control the force or makes it possible to use the force better.

Allowing a relative rotational motion between the outer lid and the inner lid has the effect of moving the inner lid translationally if the seal sticks when the lid is being removed. As a result, much less force is required to remove the lid, and the sealing ring can be removed from the interior of the housing wall without destroying it.

In one advantageous preferred embodiment, the inner lid is secured to the filter housing by an attachment mechanism.

This attachment mechanism is advantageously located between the inner lid and the outer lid, so that the inner lid is not directly connected to the wall of the filter housing. Rather, the latching position is reached only when the outer lid is mounted and an axial clamping force is applied via the outer lid, so that axial forces acting on the inner lid are first applied to the outer lid and through the outer lid are introduced into the wall of the housing opening and into the filter housing.

The pressure relief valve is advantageously integrated into the inner lid. Between the inner lid and the outer lid, a discharge path is formed through which the medium can escape from the interior of the filter housing when the pressure relief valve is open. The discharge path between the inner lid and the outer lid reduces the pressure pulse of the medium to be discharged. The discharge path can be configured, in particular, as an approximately plate-shaped outlet space, which essentially extends across the axial surface of the inner lid and outer lid. A discharge into the environment can occur via axial flow paths, which are formed in an overlapping circumferential section between the outer lid and the inner lid. In this configuration the outer lid covers the pressure relief valve to protect it from dirt and mechanical damage.

BRIEF DESCRIPTION OF THE DRAWINGS

The invention will be described in further detail hereinafter with reference to illustrative preferred embodiments shown in the accompanying drawing figures, in which.

DETAILED DESCRIPTION OF PREFERRED EMBODIMENTS

Figure 1:
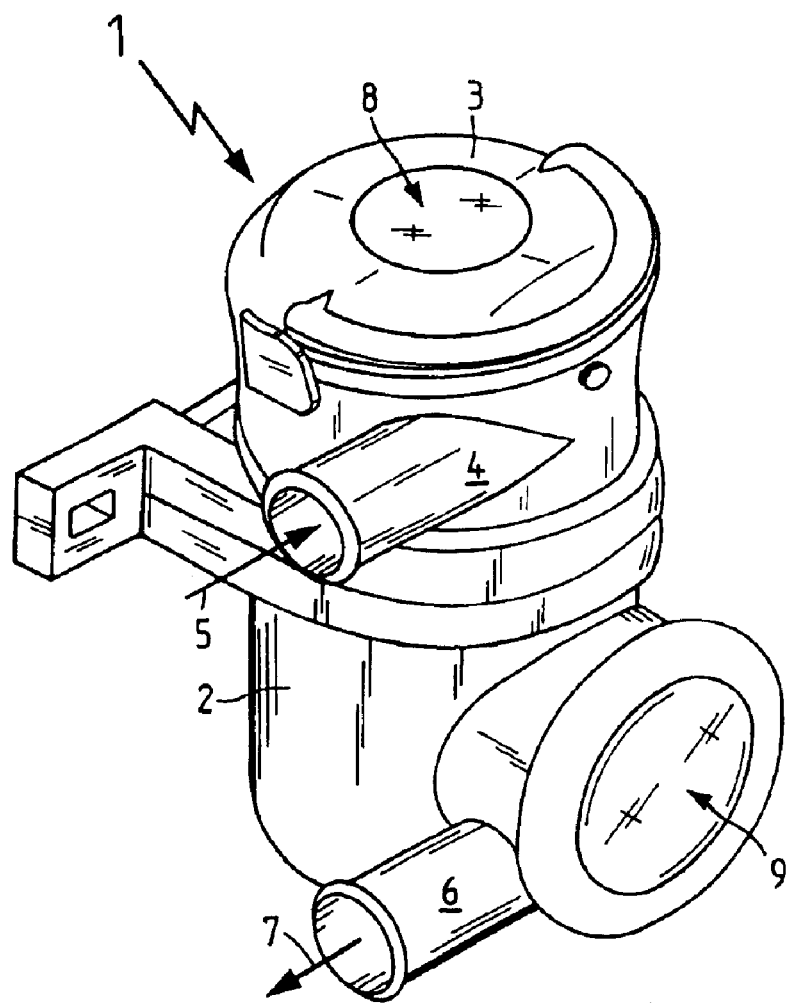
FIG. 1 is a perspective view of a filter device having a housing lid in which a pressure relief valve is disposed.

The filter device 1 shown in FIG. 1 has a filter element through which a medium to be filtered flows and which is located inside an approximately cylindrical housing 2 that can be sealed by a removable housing lid 3. The medium to be filtered can be introduced into the interior of the filter device in the direction indicated by the arrow 5 through an inlet 4 that is disposed on the side of the filter housing 2. After being filtered, the medium is discharged in the direction of the arrow 7 through an outlet 6, which is likewise disposed on the side of the housing. The medium to be filtered can be a gas or possibly also a liquid.

According to a preferred embodiment, the filter device 1 is configured as an oil separator in which oil droplets are separated from an oil/air mixture formed, for example, in the crankcase of an internal combustion engine. The air discharged from the crankcase is filtered and supplied, in particular, to an inlet port of the internal combustion engine. However, the filter device can also be used in a gas filter or a liquid filter.

Figure 2:
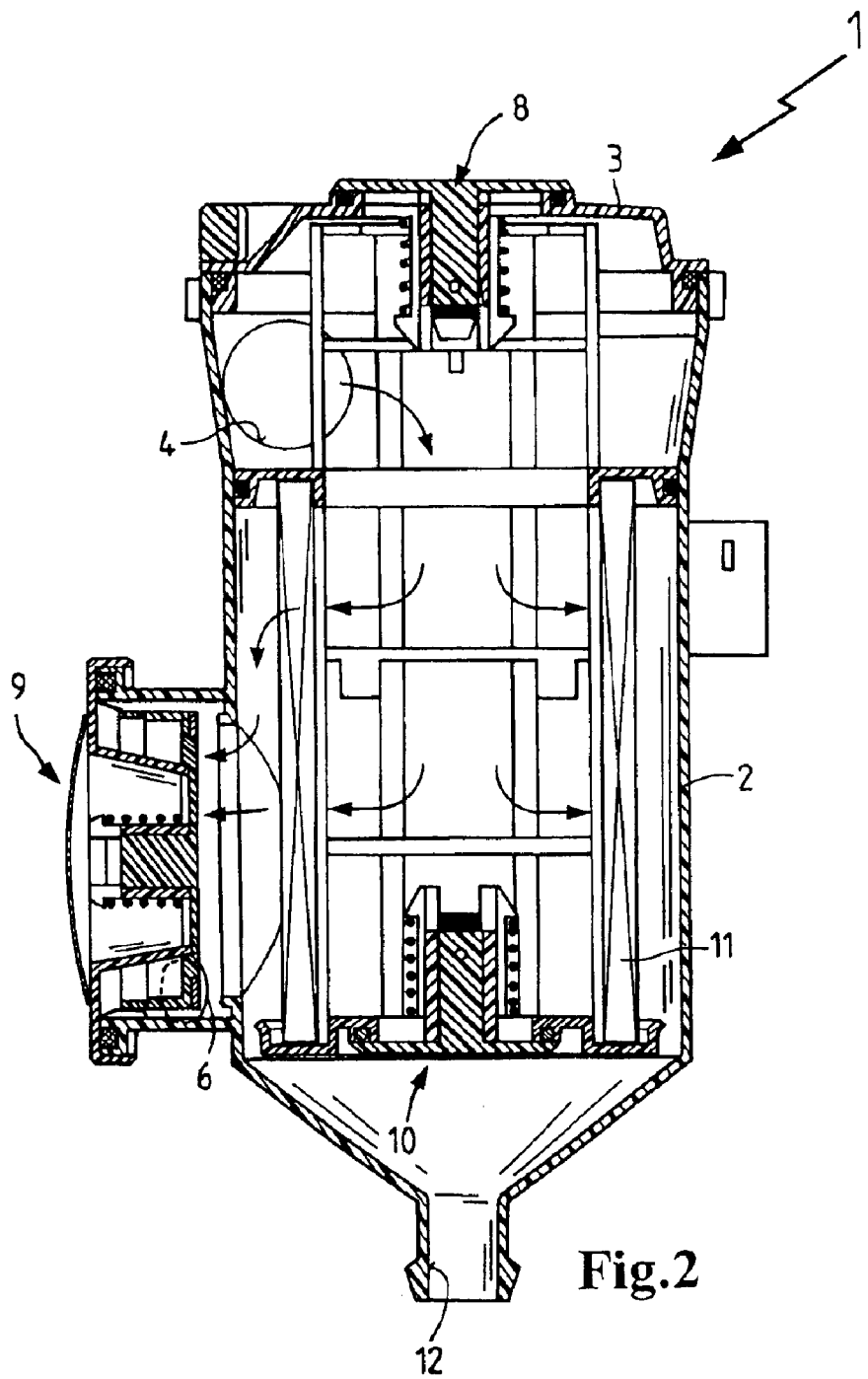
FIG. 2 is a longitudinal section of the filter device of FIG. 1.

As can be seen from FIG. 1 in conjunction with FIG. 2, a pressure relief valve 8 is integrated into the housing lid 3 disposed in the area of an axial end face of the filter housing 2. This pressure relief valve is subject to the pressure of the inlet side of the filter element. If an allowable pressure limit is exceeded, this valve moves to the open position, so that the medium introduced on the unfiltered side can escape the filter housing to prevent overload.

On the filtered side of the filter device, a pressure regulating valve 9 is disposed in the region of the outlet 6. This pressure regulating valve serves to prevent an excessive negative pressure in the crankcase. There must always be a relatively low negative pressure here, which varies within a very small pressure range. If the negative pressure on the side of the intake manifold were very high, it would propagate counter to the direction of arrow 7 through the normally open pressure regulating valve 9, counter to the direction of arrow 5 all the way into the crankcase.

The pressure regulating valve 9 is always in the open position when a relative negative pressure within the desired pressure range with respect to the outside of the filter device 1 is present on the filtered side. This is achieved by biasing the pressure regulating valve 9 with a valve spring 23 (See FIG. 5). However, if the relative negative pressure of the filter device 1 in relation to the outside pressure exceeds the bias of the valve spring 23 acting against this pressure, the pressure regulating valve moves to the closed position.

As the sectional view according to FIG. 2 further shows, the medium to be filtered is introduced into the interior of the filter housing 2 through the inlet 4. The filter housing contains a cylindrical filter element 11 whose radial interior forms the inlet or unfiltered side, from where the fluid to be filtered flows radially through the filter element from the inside to the outside.

In the case of a separator, the separated oil droplets drain in downward direction along the radial inner surface of the filter element 11. The filtered air passes radially through the filter element from the inside to the outside, is collected in an annular space that radially encircles the filter element 11 and after passing through the pressure regulating valve 9 is discharged toward the outside.

A bypass valve 10 is disposed in the bottom region in the interior of the filter element 11. If a minimum pressure is exceeded, this bypass valve moves to the open position, whereupon the separated oil droplets drain in downward direction through a conically tapering region of the filter housing 2 and are discharged through a discharge opening 12.

Figure 3:
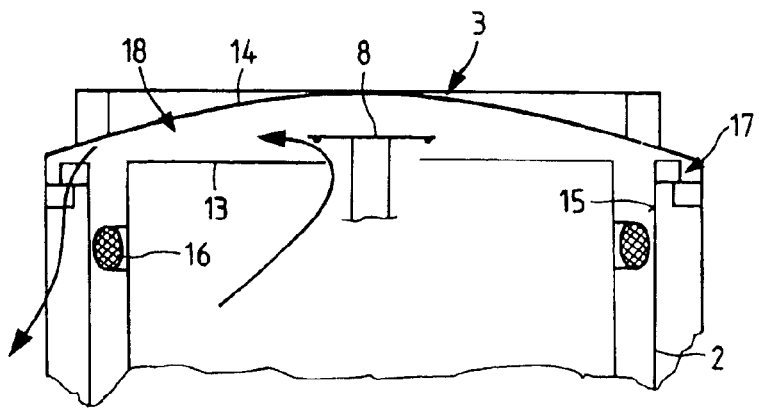
FIG. 3 is a schematic view of a two-part housing lid for a filter device according to the invention.
Figure 4:
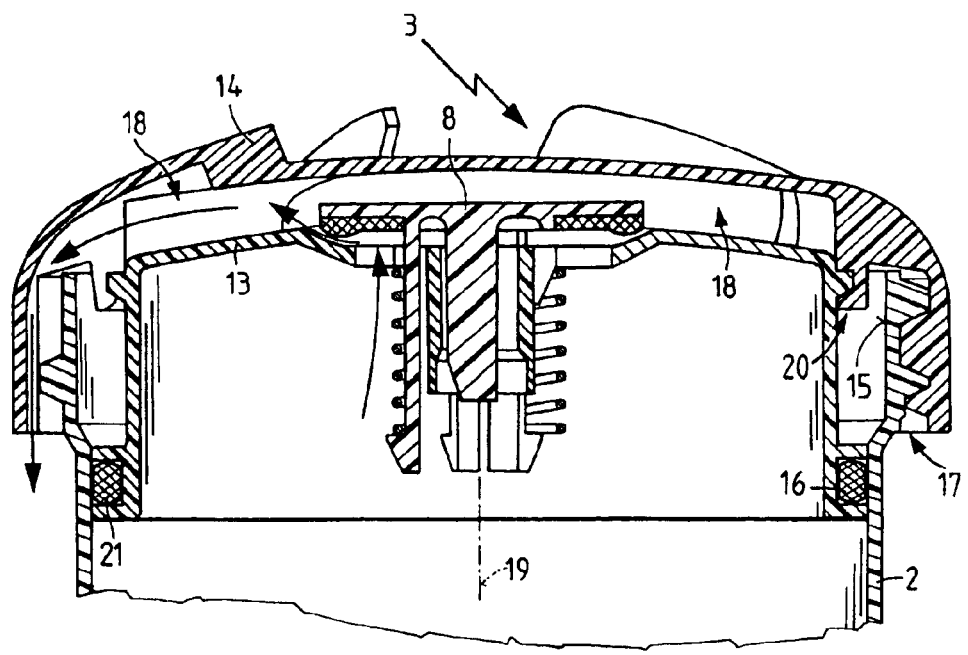
FIG. 4 shows mechanical details of the two-part housing lid of FIG. 3.

FIGS. 3 and 4 show a modified embodiment of a housing lid 3. The housing lid 3 is constructed in two parts and comprises an inner lid 13 and an outer lid 14. The inner lid 13 is inserted into a housing opening 15 of the filter housing 2. A sealing ring 16 is mounted on the outside of the inner lid 13 and fits against the inner wall of the housing opening 15 to form a seal.

The outer lid 14 is approximately parallel to the inner lid 13 and covers the housing opening 15, so that the inside of a cylindrical wall section of the outer lid 14 is adjacent the outside wall of the housing opening 15. The outer lid 14 is connected to the wall of the housing opening 15 via a locking mechanism 17.

The inner lid 13 carries the pressure relief valve 8, which in the open position opens a flow path through the inner lid 13 into a discharge path 18 formed between the inner lid 13 and the outer lid 14. This discharge path 18 is formed, in particular, because the inner lid 13 and the outer lid 14 are spaced apart from each other to form an approximately plate-shaped flow space that essentially extends across the end face of the inner lid and the outer lid.

It may also be advantageous to provide flow grooves on the outside of the inner lid 13 and/or on the inside of the outer lid 14 for the excess pressure that is to be discharged from the interior of the filter housing 2. The medium flowing into the discharge path 18 when the pressure relief valve 8 is open is guided radially outwardly and leaves the discharge path 18 between the inner lid 13 and the outer lid 14 through axial flow gaps formed between the outer wall of the housing opening 15 and the inside of the cylindrical section of the outer lid 14.

As FIG. 4 shows in detail, the locking mechanism 17 which connects the outer lid 14 to the wall of the housing opening 15 is configured as a locking thread. The locking thread has sections of different pitch. The section with the smaller pitch is located in a region adjacent to the locked position of the outer lid 14, which in FIG. 4 is formed by the lower part of the thread on the outer wall of the housing opening.

A section with a larger pitch is arranged in the region of the axial end face of the housing opening. As a result, when the outer lid 14 is placed onto the locking thread, a relatively large axial displacement occurs initially along the longitudinal filter axis 19 in the direction of the locked position because of the large thread pitch.

In contrast, when the section with the smaller pitch is reached near the tight seat or the locked position of the outer lid 14, the outer lid is displaced more slowly in axial direction. As a result, especially if the housing lid is tightened manually, more force or a better controllable force is available to get a tight seat.

Axial flow grooves may be made in the locking thread to enable the fluid to flow freely in the outflow space or the discharge path 18.

In addition to the locking mechanism 17 between the wall of the housing opening 15 and the outer lid 14, an attachment mechanism 20 is provided, which is disposed between the inner lid 13 and the outer lid 14 and enables positive locking in axial direction between the inner and the outer lid. The attachment mechanism 20 comprises one or more attachment projections, which are preferably arranged on the outer circumferential side of the inner lid 13, and an attachment groove formed in the inner lateral surface of the outer lid 14. The attachment mechanism 20 enables a rotatable by axially fixed connection between the inner lid and the outer lid.

Advantageously, the latched position is reached only after a tight seat is achieved. To construct a bayonet lock requiring an axial displacement and a rotational motion to be executed consecutively, it may furthermore be advantageous not to make the attachment projections on the outside of the inner lid 13 circumferentially contiguous but with intermittent gaps by distributing, for example, three individual attachment projections at a 120° angle, which are associated with correspondingly configured attachment groove sections on the outer lid. The attachment mechanism 20 represents an additional safeguard against accidental detachment of the housing lid.

As FIG. 4 further shows, the sealing ring 16 is disposed in a circumferential sealing groove 21 formed on the outside of the inner lid 13. The partition of the housing lid 3 into two separate lid parts has the advantage that there is a functional separation between the inner lid and the outer lid. The inner lid 13 carries the sealing ring 16, while the outer lid 14 has the function of locking the two lid parts on the filter housing 2 and furthermore protecting the pressure relief valve 8 against dirt.

This functional separation has the further advantage that the sealing ring is not twisted when the lid is opened and closed, but needs only to be translationally displaced in the direction of the longitudinal axis 19 together with the inner lid 13. Since the sealing ring 16, particularly after having been in its sealing position for a prolonged period of time, can adhere to the adjacent inner wall of the housing opening 15, less force is required for a translational axial removal of the inner lid than would be necessary for a rotational motion. This protects the sealing ring and prevents damage during insertion and removal.

In addition, the two-part configuration of the housing lid 3 has the advantage of reducing the design complexity of the discharge path 18, which is formed between these two parts and through which the excess pressure escaping from the interior of the housing when the valve 8 is open can be discharged toward the outside.

The inner lid 13, the outer lid 14, the locking mechanism 17 and the attachment mechanism 20 can all be made of synthetic resin material (i.e., plastic).

Figure 5:
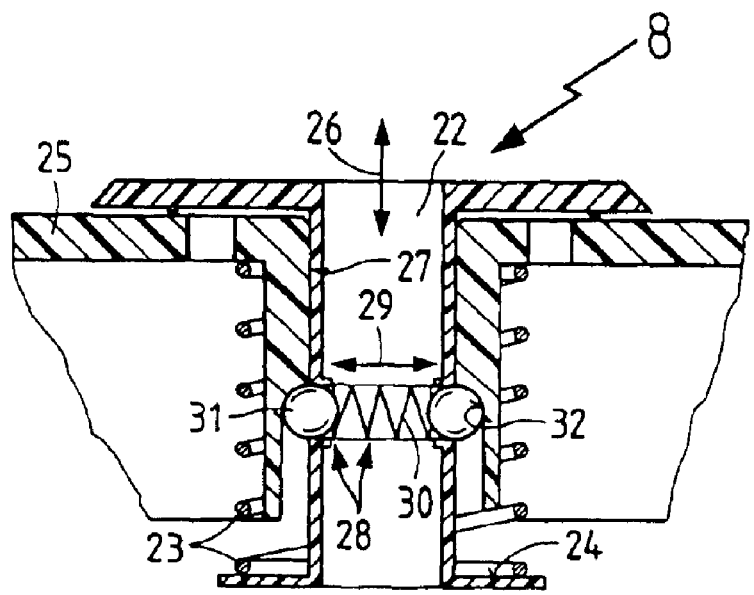
FIG. 5 is a schematic view of a pressure relief valve in which the valve body, with the valve in the closed position, is subject to a clamping force of a clamping mechanism acting perpendicularly to the displacement direction of the valve body.

FIG. 5 shows a special embodiment of a pressure relief valve 8. The pressure relief valve 8 has a valve body 22, which must be displaced axially in displacement direction 26 in a valve body guide 27 between the closed position shown in FIG. 5 and a lifted, open position. The valve body guide 27 is formed in a housing part 25.

The valve body 22 is urged into the closed position by a valve spring 23, which is supported on a valve disk 24 that is fixed to the valve body 22. If an overpressure in the interior of the housing exceeds the closing force of the valve spring 23, the valve body 22 moves to the open position so that the excess pressure can escape.

To influence the spring characteristic and the opening or closing behavior, the pressure relief valve 8 is provided with a clamping mechanism 28, which applies a clamping force to the valve body 22. This clamping force acts in radial direction as indicated by arrow 29 perpendicularly to the displacement direction 26 and firmly clamps the valve body 22 in the valve body guide 27.

The clamping mechanism 28 is fixed to the valve body 22 and comprises an additional spring 30, which is configured, in particular, as a compression spring whose spring effect extends in the direction of arrow 29. The additional spring 30 is connected to latching balls 31 on its two axial end faces. The force of the additional spring applies a clamping force to these latching balls 31 in a radially outward direction so that they are pressed into latching recesses 32 that are formed in the inner wall of the valve body guide 27 and are advantageously adapted to the shape of the latching balls 31.

In the closed position of the valve body 22 the clamping mechanism 28 is in the latching position, so that a higher overpressure is required to move the pressure relief valve 8 into the open position than in embodiments without such a clamping mechanism 28. The amount of additional pressure required to detach the clamping mechanism 28 and to move the valve to the open position can be influenced through the force of the additional spring 30, the geometry of the latching elements subject to the pressure of the additional spring, and the geometry of the latching recesses.

Once the pressure limit above which the valve moves to the open position has been reached, the latching balls 31, because of the axial displacement of the valve body in the direction of the open position, are first pushed inwardly against the force of the additional spring 30 and, as the opening motion proceeds, fit against the inner wall of the valve body guide 27. The clamping force exerted by the clamping mechanism on the inner wall of the valve body guide in the intermediate transitional section between the closed position and the open position is clearly smaller than the clamping force in the closed position of the valve. This is true because in the clamping position the clamping mechanism assumes a positive-locking latched position, while in the intermediate transitional section it only glides along the inner wall.

Furthermore, it must be taken into account that in the initial position of the valve body, increased static friction must be overcome between the latching elements biased by the additional spring and the latching recesses. In contrast, when the valve body is moving, a smaller gliding effect acts between the latching elements pushed in outward direction and the inner wall of the valve body guide.

This marked drop of the clamping force changes the overall spring characteristic and the opening behavior of the valve. Compared to configurations of the prior art, the valve body can move more rapidly from the closed position to the open position. The valve can be abruptly actuated to the open position.

Figure 6:
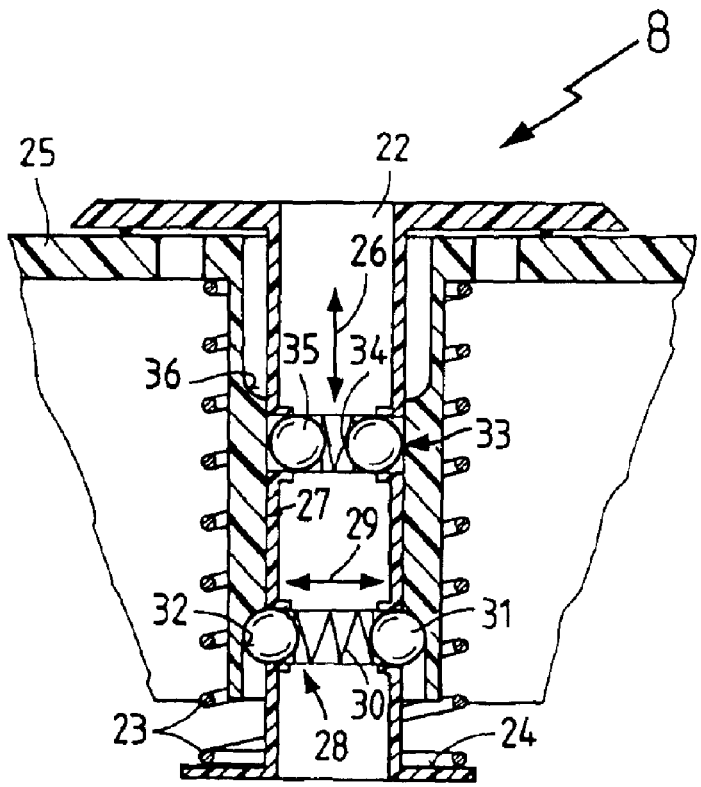
FIG. 6 shows a modified pressure relief valve embodiment with two separately configured clamping mechanisms which apply a clamping force to the body of the pressure relief valve in both the closed position and in the open position.

The embodiment illustrated in FIG. 6 also shows a pressure relief valve 8, which is in the closed position and must be moved axially in displacement direction 26 between the closed position and the open position. This valve, like the valve of the preceding embodiment, has a clamping mechanism 28 applying pressure to the valve body 22 in the closed position in the direction of the arrow 29 with a clamping force perpendicular to the displacement direction 26.

Furthermore, a second clamping mechanism 33 is provided, which is configured correspondingly to the first clamping mechanism 28 and comprises an additional spring 34 and axial latching balls 35 subject to the pressure of the additional spring 34. In the open position of the valve the latching balls 35 engage latching recesses 36 formed in the inner wall of the valve body guide 27. Thus, the valve body 22 is in a latched position both in the closed position and in the open position and can be moved to the respectively opposite end position only with increased force compared to embodiments without clamping mechanisms.

The closing movement of the valve is supported by the force of the valve spring 23. As soon as the overpressure in the interior of the housing falls below a limit, the force of the valve spring is sufficient to displace the valve body 22 axially against the remaining overpressure in the interior of the housing and against the clamping force of the second clamping mechanism 33 in the direction of the closed position.

Analogous to the opening movement, the valve can be abruptly closed with the aid of the second clamping mechanism 33 because the clamping force is abruptly reduced as soon as the latching balls 35 of the second clamping mechanism 33 are lifted out of their seat in the latching recesses 36.

The foregoing description and examples have been set forth merely to illustrate the invention and are not intended to be limiting. Since modifications of the described embodiments incorporating the spirit and substance of the invention may occur to persons skilled in the art, the invention should be construed broadly to include all variations within the scope of the appended claims and equivalents thereof.

What is claimed is:

1. A filter device comprising a filter element arranged in a filter housing that can be sealed by a housing lid with a sealing ring, wherein a medium to be filtered is supplied to the filter element through an inlet opening in the filter housing, and filtered medium is discharged on the filtered side of the filter element through an outlet opening in the filter housing; the housing lid is divided into two parts and comprises an inner lid and an outer lid; the inner lid can be inserted into a housing opening with the sealing ring arranged between the inner lid and a wall of the housing opening, and the outer lid covers the housing opening and is secured to a wall of the housing opening in a locked position by a locking mechanism.

2. A filter device according to claim 1, wherein the locking mechanism comprises a locking thread.

3. A filter device according to claim 2, wherein the locking thread has sections of different thread pitch.

4. A filter device according to claim 3, wherein the locking thread on the housing opening has a section of a smaller pitch in the area adjacent to the locked position of the outer lid.

5. A filter device according to claim 1, wherein the inner lid is secured to the outer lid by an attachment mechanism arranged between the inner lid and the outer lid.

6. A filter device according to claim 5, wherein the attachment mechanism comprises at least one attachment projection that engages an attachment groove in a positively locking manner.

7. A filter device according to claim 1, wherein the inner lid carries the sealing ring.

8. A filter device according to claim 7, wherein the sealing ring is disposed in a circumferential sealing groove on the outside of the inner lid.

9. A filter device according to claim 1, wherein a pressure relief valve subject to the pressure on the intake side of the filter element is integrated into the inner lid.

10. A filter device according to claim 1, wherein a discharge path is formed between the inner lid and the outer lid.

11. A filter device according to claim 1, wherein said filter device is a crankcase ventilation filter.

* * * * *